United States Patent [19]
Yee et al.

[11] Patent Number: 5,781,723
[45] Date of Patent: Jul. 14, 1998

[54] SYSTEM AND METHOD FOR SELF-IDENTIFYING A PORTABLE INFORMATION DEVICE TO A COMPUTING UNIT

[75] Inventors: Bennet Yee, San Diego, Calif.; Josh Benaloh, Redmond, Wash.

[73] Assignee: Microsoft Corporation, Redmond, Wash.

[21] Appl. No.: 657,354

[22] Filed: Jun. 3, 1996

[51] Int. Cl.⁶ .................................................. H04K 1/00
[52] U.S. Cl. ................................................ 395/186; 380/25
[58] Field of Search ........................... 395/186, 187.01, 395/188.01; 380/23, 24, 25, 4

[56] References Cited

U.S. PATENT DOCUMENTS

| | | | |
|---|---|---|---|
| 4,663,612 | 5/1987 | Majia et al. | |
| 5,157,726 | 10/1992 | Merkle et al. | 380/23 |
| 5,426,700 | 6/1995 | Berson | 380/23 |
| 5,557,518 | 9/1996 | Rosen | 364/408 |
| 5,594,228 | 1/1997 | Swartz et al. | 235/383 |
| 5,604,801 | 2/1997 | Dolan et al. | 380/21 |

*Primary Examiner*—Albert Decady
*Attorney, Agent, or Firm*—Lee & Hayes, PLLC

[57] ABSTRACT

A system includes a portable information device and a computing unit, and is architected to enable the portable information device to identify its type and properties to the computing unit. The portable information device has a processor and a memory. The memory stores a device class tag which is indicative of a type of the portable information device. When communication is established between the portable information device and the computing unit, the portable information device sends an initial message which includes a result of a mathematical operation involving the device class tag. The mathematical operation renders it computationally difficult or infeasible to deduce the device class tag from the result so that the device class tag is not exposed from the portable information device. The result might be a hash value of the device class tag which is derived using a hashing function, or data that has been signed using the device class tag as a private signing key. The computing unit uses the tag-related portion of the message to identify the type of the portable information device. The computing unit has access to a record which correlates the hash value or complementary device class public signing key (i.e., the complementary version of the device class tag when used as a private signing key) with the type of device, as well as with the device's security properties and operating attributes. The computing unit cross-references the hash value or device class public signing key to determine the device type. The computing unit can be a certifying authority which issues a certificate confirming the identity and type of portable information device. The certificate is stored on the portable information device and presented thereafter to all communicating agents to identify the device type and attributes for transactions.

38 Claims, 5 Drawing Sheets

SYSTEM AND METHOD FOR SELF-IDENTIFYING A PORTABLE INFORMATION DEVICE TO A COMPUTING UNIT

TECHNICAL FIELD

This invention relates to portable information devices, such as smart cards, PC cards, portable digital assistants, personal information managers, and the like. More particularly, this invention relates to an architecture which enables a portable information device to identify its type and its properties to a computing unit to which it communicates.

BACKGROUND OF THE INVENTION

Electronic portable information devices are becoming widely used to digitally store and physically transport personal information. These portable information devices are typically small compact devices having memory, some processing capabilities, and an interface which enables data to be input andor output. The portable information devices might also include some user interface, such as a keypad or display. Common examples of portable information devices include smart cards, PC cards (formerly PCMCIA cards), portable digital assistants (PDAs), pagers, personal information managers (PIMs), and other hand held devices.

As portable information devices are used to store security sensitive data (such as bank records, credit card numbers, and so on), manufacturers have begun constructing the devices with various tamper-resistant qualities that attempt to dissuade or prevent unauthorized access to the data. The tamper-resistant qualities can be in the form of physical protections which aim to prevent attackers who have physical possession of the device from gaining access to the data contents. Alternatively, the tamper-resistant qualities might be operational protections which, aim to prevent covert access to data on the device during seemingly normal operating conditions.

Tamper-resistant techniques are evolving in step with technology. As devices become more sophisticated, the tamper protection schemes likewise become more sophisticated. Accordingly, over time, different portable electronic devices have different levels of tamper-resistant security. This is true, for example, in the smart card arena. Earlier smart cards that were once difficult to reverse engineer have become relatively easy to attack using today's technology.

Some manufacturers have added cryptographic security protections in the form of data encryption, decryption, signing, and authentication. Cryptographic operations involve mathematical functions in which "keys" are employed for encrypting/decrypting and signing/authenticating. "Keys" are a numerical value, often expressed digitally as a sequence of bits, which are uniquely associated with a particular identity, such as a user, a portable information device, or a computer. In general, security depends upon the key length and the strength of the cryptographic algorithm. However, as computer processing capabilities continue to improve, key lengths that were once thought to be strong or computationally infeasible to determine are today easy to break or decipher.

On the other hand, not all portable information devices need the same tamper-resistant features. For instance, a smart card configured to store tokens for a public transportation system might not need as much tamper-resistance as an electronic wallet that is used to store a user's bank records. Tamper-resistant features have associated costs, and adding more robust protection schemes might result in higher manufacturing costs. Accordingly, depending upon the type of device and the kind of resources being stored, manufacturers employ different security levels.

As a result, there is evolving an environment where different portable information devices are equipped with different degrees of tamper-resistance. As these devices are used to interface with other communicating agents, it would be advantageous from the perspective of the communicating agents to know the properties of the portable information devices before conducting any transactions with them. For example, before a bank ATM downloads any critical financial information to a portable information device, the bank ATM would appreciate knowing whether the portable information device is a PC card with very little security or an electronic wallet with state-of-the-art security. In the former situation, the ATM might forego any transaction, or only communicate non-confidential information. In the latter situation, the bank ATM can be reasonably satisfied that the critical information will be protected by the portable information device.

However, there is no present method which allows portable information devices to securely identify their type and their properties to a communicating agent in a manner which can be trusted by the communicating agent. There is a need to develop such methods.

SUMMARY OF THE INVENTION

This invention concerns an architecture which allows portable information devices to securely identify themselves and their properties to a communicating agent in a manner which can be trusted by the communicating agent.

The portable information device has a processor and a memory. The memory stores data and a device class tag indicative of a type of the portable information device. The device class tag is preferably permanently embedded in the device by the manufacturer during production.

The portable information device registers itself with a certifying authority. The portable information device generates a pair of public and private keys and creates a certification request containing the public key, the device serial number, and other information. The request also includes a result of a mathematical operation involving the embedded device class tag which can be used to identify the device type, without exposing the device class tag itself. The mathematical operation renders it computationally difficult to deduce the device class tag from the mathematical result. In one implementation, the request includes a hash value of the device class tag that is derived using a hashing function. In another implementation, the public key generated by the portable information device is signed using the device class tag as a private device class signing key. In either example implementation, the request includes some portion (i.e., the hash value or signature) that is derived from the device class tag, yet the device class tag is not exposed in its raw form from the portable information device.

The certifying authority identifies the type of portable information device from the request. The certifying authority has access to manufacturer records provided by the device manufacturers which correlate the types and security attributes of devices, with the mathematical complements of the device class tags. The certifying authority might store such records or access them over a network, such as the Internet.

In the first implementation, the manufacturer record correlates a group of hash values with device types. The certifying authority has access to this record and identifies the device type by cross-referencing the hash value received in the certification request from the portable information device. In the second implementation, where the device class tags operate as private device class signing keys, the record correlates the device types with the public device class signing keys that are complementary to the private device class signing keys embedded on the portable information devices. The request contains a suggested public device class signing key which is used by the certifying authority to unsign the public key in the certification request which had been signed using the private device class signing key. If successful, the public device class signing key is then cross-referenced to the device type using the manufacturer record.

If the information included in the certification request is positively confirmed, the certifying authority creates a certificate, signs it, and issues the certificate to the portable information device. The certificate includes the signed public key, the device serial number, and a public key of the appropriate enterprise or vendor. The certificate might also include a security level, or might itself implicitly indicate a certain security level. The certificate is stored on the portable information device. The certificate might also include an expiration date.

During subsequent transactions, the portable information device submits the certificate to a communicating computing unit. The computing unit learns the device type or security level from the certificate. The certificate information is trusted because the certificate is signed by the certifying authority and the computing unit can verify this signature. The computing unit then determines whether the device possesses sufficient tamper-resistant features for the requested transaction. If a higher security protocol is required than that provided by the device, the computing unit can cease communication to avoid sending any security-sensitive information to the inadequately protected device.

DETAILED DESCRIPTION OF THE PREFERRED EMBODIMENT

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996), which is hereby incorporated by reference.

Figure 1:
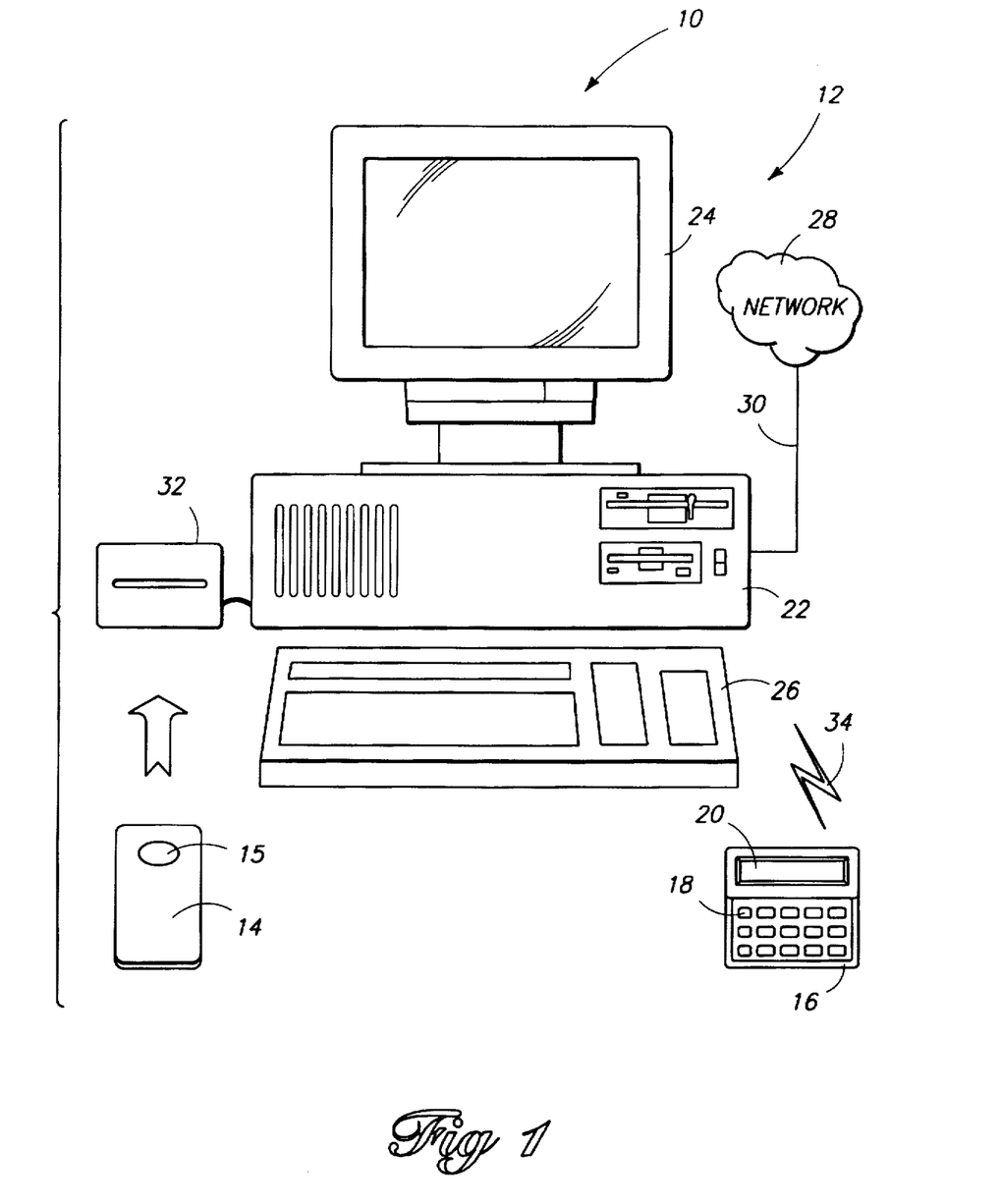
FIG. 1 is a diagrammatic illustration of a system in which portable information devices self-identify their type and attributes to a computing unit.

FIG. 1 shows a system 10 having a computer 12 and portable information devices in the form of a smart card 14 and a portable digital assistant (PDA) 16. As used herein, the term "portable information devices" means portable electronic devices that have processing capabilities, memory, and an interface to permit input and/or output of data. Such devices might also include a user interface as represented by a keypad 18 and a display 20 on PDA 16. However, other portable information devices can be implemented without user interfaces as represented by the smart card 14. A smart card is the approximate size of a standard credit card and has a built-in microcontroller integrated circuit 15 mounted on an otherwise plastic card. A smart card is physically constructed in accordance with the international standard ISO-7816 which governs size and bendable limits of the plastic card, as well as size and location of the silicon integrated circuit. In addition to smart cards and PDAs, other examples of portable information devices include PC cards or other forms of integrated circuit (IC) cards, personal information managers (PIMs), pagers, electronic wallets, palmtop computers, and other hand held devices.

The computer 12 includes a central processing unit (CPU) 22, a monitor or display 24, and a keyboard 26 (or other input device). The computer 12 is connected to a network 28 via a cable or wireless connection represented by line 30. The network 28 can be a data communications network including a wire-based network, such as an enterprise network (e.g., a local area network for a business) or a public network (e.g., the Internet), and a wireless network (e.g., satellite network). The network 28 can also be implemented as a telephone network, or an interactive television network, or any other form for linking the computer 12 to an external source of information.

The computer 12 acts as a communicating agent which is capable of compatibly communicating with the portable information devices. In the illustrated embodiment, the computer 12 communicates with the smart card 14 via a card reader 32 and with the PDA 16 via a wireless communication link 34 (e.g., infrared, radio, optical).

The illustrated computer is shown as a desktop computer that a user might have at home or work, but is representative of different implementations. For example, the computer 12 might be implemented as a PC-based point-of-sale machine or kiosk that is employed by merchants, or an automatic teller machine (ATM) used by banks, or a computerized vending machine, or an electronic ticket apparatus, or a set-top box. There are many different forms that the computer 12 might assume, with each possible computer implementation being capable of exchanging data with the portable information devices.

Each portable information device has tamper-resistant features in the form of physical protections or operational protections. An example physical protection is the tamper-resistant construction of the IC chip used in a smart card. The die process and chip layout make it difficult to reverse engineer and retrieve the data from the die. An example of operational protections is use of cryptography protocols to protect access to data stored on the portable information device and communication with a communicating agent.

This invention concerns an architecture which allows portable information devices to securely identify themselves and their properties to a communicating agent, such as the computer 12, in a manner which can be trusted by the communicating agent. Although the devices avary significlly identical, they may vary significantly in terms of their ability to withstand attack. When these devices interface with the computing unit 12, it would be advantageous from the perspective of the computing unit 12 to know the properties of the portable information devices 14 and 16 before conducting any transactions with them. A bank ATM, for example, might require that the portable information devices have a certain security level before they are acceptable to receive security-sensitive financial information. A vending machine, on the other hand, might require a much lower security level. A portable information device with very little security might be entirely unacceptable to the bank ATM, but wholly acceptable to the vending machine.

The architecture described herein provides a way for the portable information devices to identify themselves to the computing unit so that the computing unit can make an informed decision as to whether to conduct transactions with the device. As part of this architecture, the device manufacturer stores a device class tag in the portable information device. The device class tag is indicative of the type of device. Device types might be segregated according to strength of tamper-resistance features, or numbers of attributes, or compatibility aspects, or the like. The device class tag might also be used to differentiate different devices based on non-security related features. For instance, different devices may be assigned different device class tags even if they have comparable security. Deciding which devices to accept is external to this architecture. Accordingly, the manufacturers produce many types of products with variable degrees of tamper-resistivity and other attributes, which are assigned different device class tags.

Figure 2:
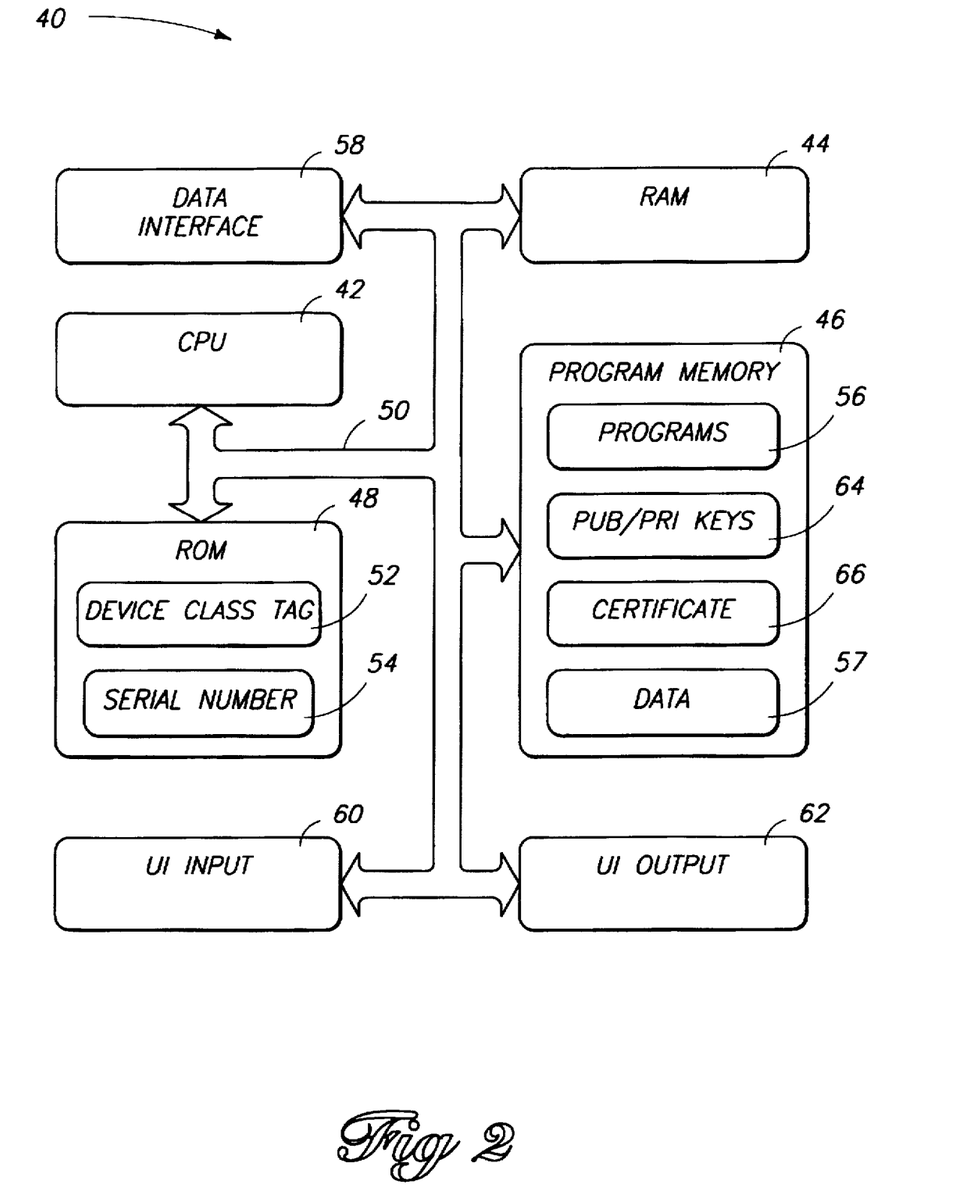
FIG. 2 is a block diagram of a portable information device.

FIG. 2 shows the functional components of a portable information device, represented generally by numeral 40. The portable information device 40 includes a CPU 42, volatile memory 44 (e.g., RAM, Flash), non-volatile programmable memory 46 (e.g., EEPROM, disk), and non-volatile memory 48 (e.g., ROM, PROM). A data/address bus 50 interconnects these components.

A device class tag 52 is stored in the device memory. Preferably, the device class tag 52 is permanently embedded on the device by burning the tag into the ROM 48 during manufacturing. A device serial number 54 is also stored on ROM 48. Various programs 56 are stored in program memory 46, along with any data 57 used in the programs or exported to an external communicating agent. The programs 56 provide the functionality of the portable information device. Example programs include a banking application which facilitates financial-related transactions with a bank or other institution; a purchase application which facilitates purchase of goods and services in an electronic marketplace; a scheduling application which manages a holder's appointments and tasks; and/or a medical application which manages a holder's medial information. Depending upon the device configuration, the device might be used for one or more purposes and thus store one or more programs.

The portable information device 40 also includes a data interface 58 which facilitates data communication with an external source. Depending upon the construction and implementation of the portable information device, the data interface 58 might be in the form of physical contacts, magnetic couplings, an IR transceiver, an RF transceiver, or the like. Additionally, the portable information device 40 might also include a user interface input 60 (e.g., a keypad), and a user interface output 62 (e.g., a display).

Figure 3:
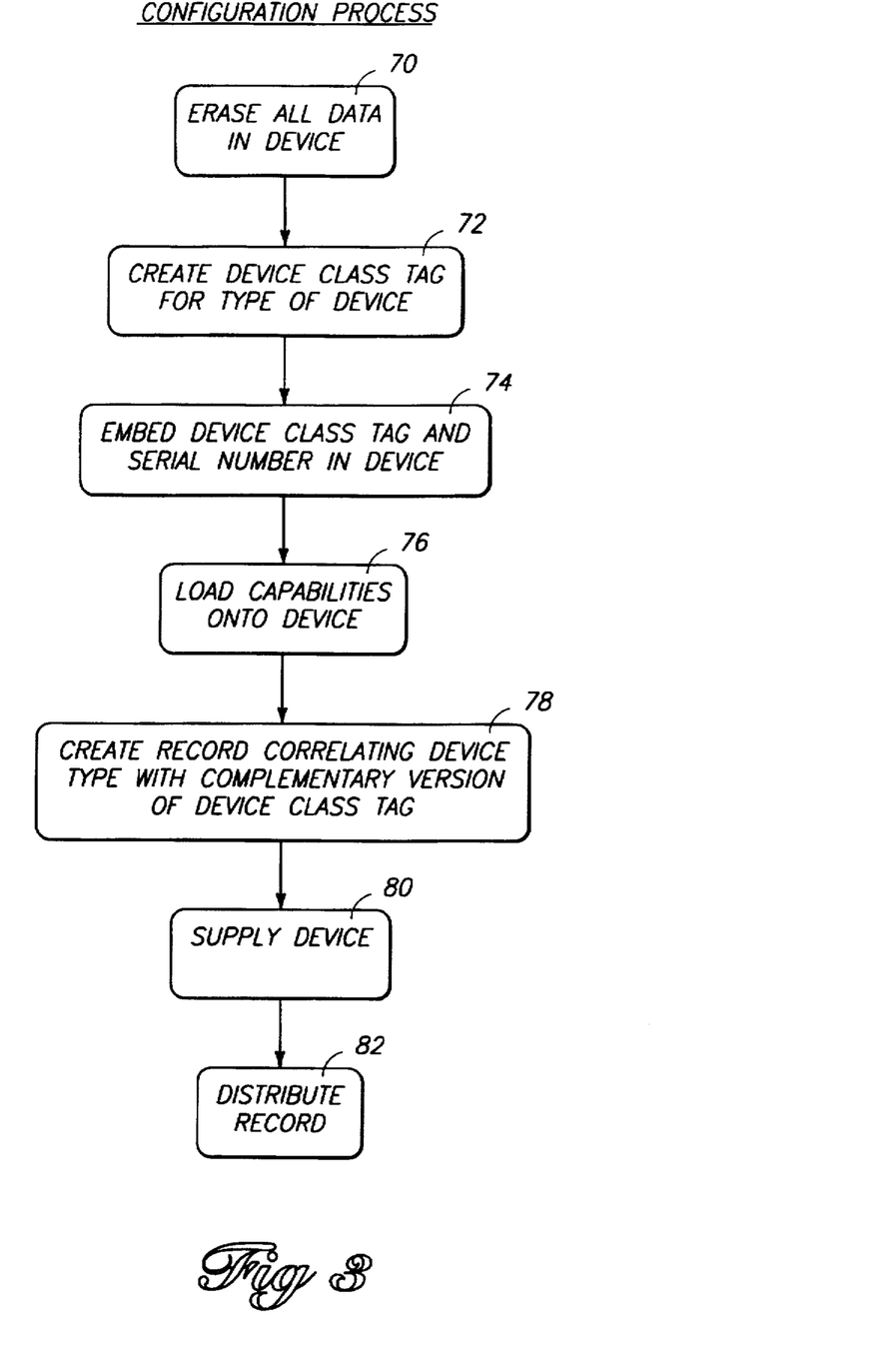
FIG. 3 is a flow diagram showing steps in a method for configuring the portable information device.

FIG. 3 shows the process for configuring the portable information device. This process can be performed by the manufacturer following production, or by a vendor who markets and sells the portable information devices to individuals or enterprises. For convenience, the process is described as being performed by the manufacturer. This process is explained with additional reference to FIG. 2.

The manufacturer initializes the portable information device by first erasing all data from the memory (step 70). The manufacturer creates and assigns a device class tag for the portable information devices being produced (step 72). This device class tag is indicative of the type of device and is therefore unique to the device type and different than other tags used with other types of devices. The manufacturer permanently embeds the device class tag 52 onto the ROM 48 (step 74). A serial number 54 is also uniquely assigned to the individual device and stored on the ROM 48.

The capabilities associated with the device type are loaded onto the portable information device (step 76). The capabilities might be in the form of cryptography capabilities, applications, and so on. As an example, a smart card of one device type might be designed only to distribute tokens for a vending machine. Routines needed to functionally carry out token storage and distribution is loaded onto the smart card at step 76. However, a smart card of another device type might be designed to generate encryption/ decryption keys, perform encryption/decryption, digitally sign messages, and authenticate signatures. This type of smart card is loaded with substantially more capabilities which enable the card to perform the cryptographic services as well as the application(s) need to interact with an external communicating agent. These capabilities may also be more generic in the form of an operating system kernel which can later load other applications.

The manufacturer produces a record which correlates the types of devices to the device class tag. More particularly, the record correlates the device types with a complementary version of the device class tag (step 78). The complementary version is mathematically derived from the device class tag in a manner which renders the device class tag computationally difficult to deduce from the complementary version. For instance, the complementary value might be a hash digest of the device class tag that was computed using a hashing algorithm. With such hashing algorithms, it is computationally infeasible to determine the device class tag from the hash digest. In another implementation, the device class key might be used as a private signing key and the complementary value is the corresponding public signing key. It is computationally difficult to determine the private signing key from the public signing key.

From the manufacturer correlation record, knowledge of the complementary value leads to identification of the type of portable information device. Table 1 shows two example entries in a manufacturer correlation record.

TABLE 1

| Manufacturer Correlation Record | | | |
|---|---|---|---|
| Complementary Tag Value (Bits) | Device Type | Security Properties | Operating Attributes |
| 0110010 ... 01100 | Smart Card 12453-ED | Encryption, Decryption, Signing, Authentication, Tamper-Resist Level 3 | MCU 6805, 16K RAM, 64K ROM, 128K EEPROM, Electrical Contacts, ISO Protocol, Proprietary OS, etc. |
| 011110 ... 110010 | PDA 35MC296 | Tamper-Resist Level 1 | MU486, 25 MHz; 640K RAM, 2M Memory, Windows OS |

The manufacture sells the devices in normal course (step 80) and distributes the correlation record to all parties that may need to determine device types (step 82).

As a simple example, suppose that the smart card 14 wishes to identify its properties and type to computing unit 12 in FIG. 1. The computing unit 12 has access to the manufacturer correlation record, either by keeping record stored in memory or by accessing the record from the manufacturer over the network 28. After the smart card 14 establishes communication with the computing unit 12, the smart card 14 forms an output string which includes at least a portion that is a result of a mathematical function involving the device class tag. For instance, the output string might include a hash digest of the device class tag or the output string, or portion thereof, or output data might be digitally signed using the device class tag as a private signing key. The smart card 14 computes the hash digest or adds a digital signature using appropriate cryptographic routines stored in memory and executed on the CPU. The output string is exported to the computing unit 12.

The computing unit 12 uses the exported output string and correlation record to identify the type of the portable information device. For instance, if the output string includes the hash digest of the device class tag, the computing unit is programmed to perform a look up of the hash value in the manufacturer correlation record to cross-reference to the device type, security properties of the device, and operating attributes.

In the case where the output string includes a signed portion, the computing unit is configured to discover the corresponding public key to unsign the message portion and index the record using the successful public key. The computing unit might derive the public key through a trial-and-error approach from a set of possible (but limited) public keys used by the manufacturer. Alternatively, the portable information device might send a signed certificate containing the corresponding public key that is expected to work with the private device class signing key for the computing unit to try. By indexing the record, the computing unit learns the device type and its operating attributes. These attributes could alternatively be included within a signed certificate.

In this manner, the portable information device effectively identifies itself and attributes to the computing unit by using the embedded device class tag (or key) to impart some information that can be used by the computing unit to deduce the device type. Moreover, upon occurrence of a successful match, the recipient computing unit can be assured that the device was produced by the manufacturer and has not subsequently been manipulated to change its attributes. In all cases, the device class tag is permanently kept secret on the portable information device, and never exposed in its raw form to the communicating agent. The manufacturer also keeps the tags confidential. This confidential protection prevents unauthorized entities from gaining access to the tags. If the tags were left unprotected, the unauthorized entities could design impostor devices with the correct device class tag and attempt to engage in transactions that the impostor devices could not otherwise become involved.

Figure 4:
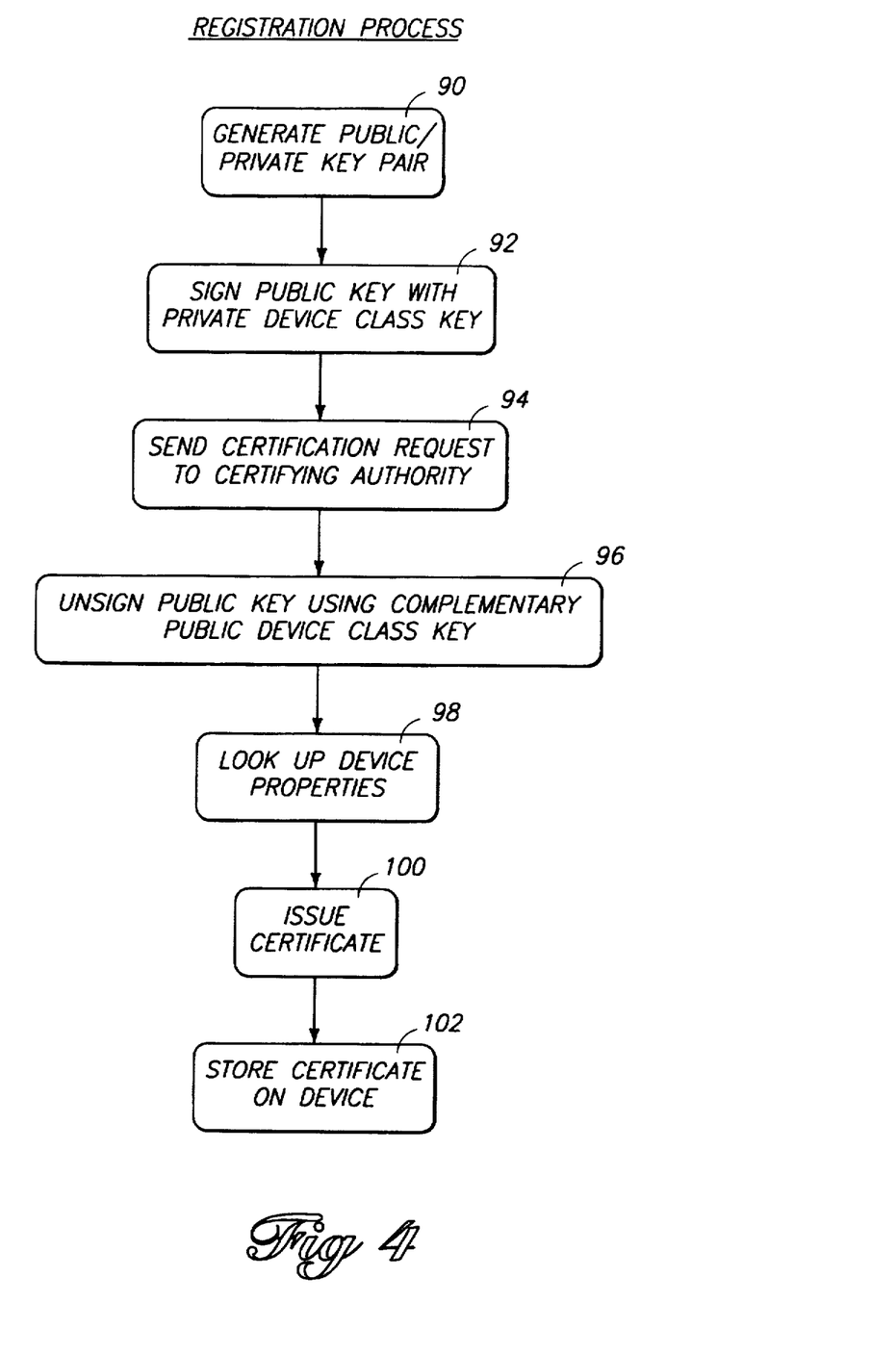
FIG. 4 is a flow diagram showing steps in a method for registering the portable information device with a certifying authority.
Figure 5:
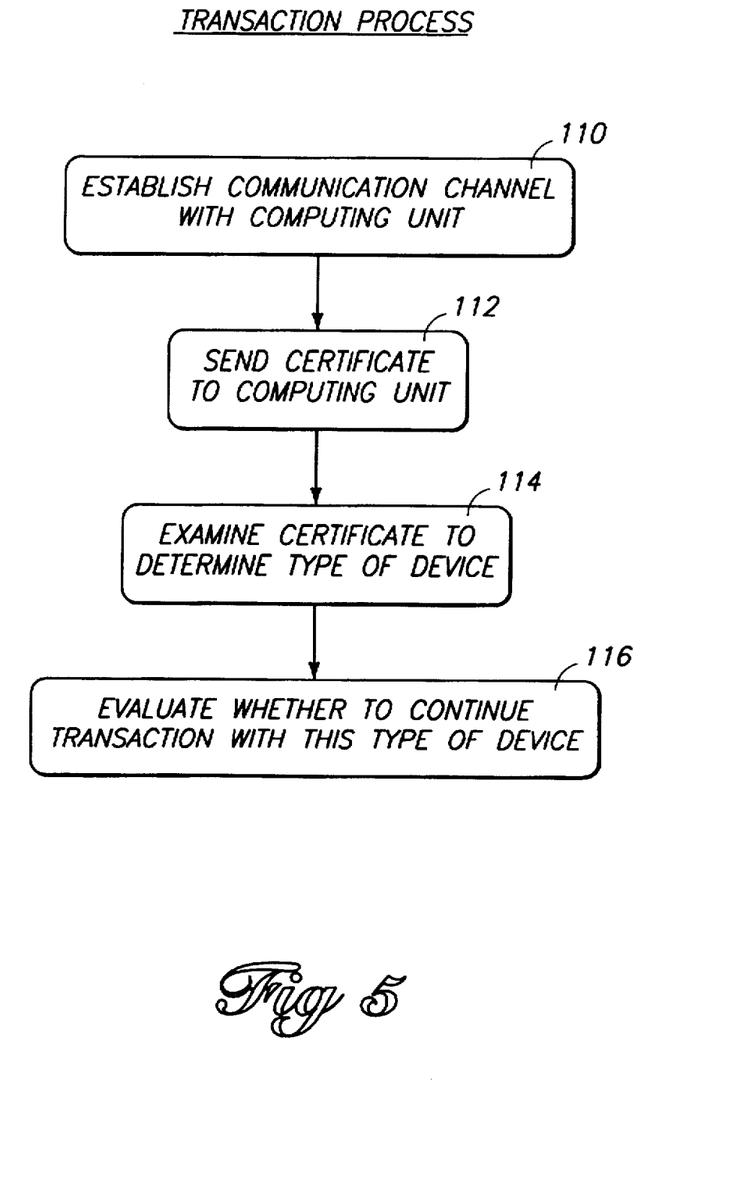
FIG. 5 is a flow diagram showing steps in a method for conducting a transaction between a portable information device and a communicating agent.

A more robust method for identifying the type of portable information device will now be described with reference to FIGS. 4 and 5. FIG. 4 shows the steps in a process for registering the device with a certifying authority and FIG. 5 shows the steps in a process for conducting a transaction involving a portable information device.

Registration

After configuration (FIG. 3), the manufacturer or vendor registers the portable information device with a certifying authority. A certifying authority or "CA" is a third party entity that is trusted by all other parties involved in a transaction or a certain environment. A certifying authority might be a bank, or a manufacturer, or an association, or a specially dedicated entity whose sole purpose is to grant certificates.

The portable information device first creates a registration request which will be transmitted to the certifying authority. The request includes the serial number of the device and any other information identifying the device. As part of the request, the portable information device also generates a pair of private and public signing keys $K_{s\_pri}/K_{s\_pub}$, which will be used in subsequent transactions (step 90 in FIG. 4). Additional key pairs can also be generated. The key pairs, which are referenced generally as number 64, are kept in program memory 46 as shown in FIG. 2.

The portable information device signs the public signing key $K_{s\_pub}$ using the device class tag as a device class private signing key $K_{device\_class\_pri}$ (step 92), according to the following signing function S:

$$Signed K_{s\_pub} = S_{Kdevice\_class\_pri}(K_{s\_pub}).$$

The corresponding device class public signing key $K_{device\_class\_pub}$ may also be enclosed in the request. In addition, if the portable information device is to be used by employees of a company or other enterprise, the request might further include a public key of the enterprise or policy vendor $K_{vendor\_pub}$. The request can be represented as follows:

$$Request=(Serial\ No., other\ ID\ info,\ Signed K_{s\_pub},\ K_{device\_class\_pub},\ K_{vendor\_pub}).$$

It is noted that an alternative implementation employs a hash digest of the device class private signing key (or tag). The hash digest is computed using a hashing function H, as follows:

$$Hash\ Digest = H(K_{device\_class\_pri}).$$

In this case, the request can be represented as follows:

$$Request=(Serial\ No., other\ ID, Hash\ Digest, K_{vendor\_pub}).$$

The portable information device sends the request to the certifying authority over a preferably secure communication channel (step 94). The certifying authority uses the associated device class public signing key $K_{device\_class\_pub}$ to unsign the generated public signing key, according to the following unsigning function S':

$$K_{s\_pub}=S'_{Kdevice\_class\_pub}(SK_{s\_pub}).$$

If the device class public signing key $K_{device\_class\_pub}$ is effective to unsign the public signing key, the certifying authority knows that the device class public signing key is complementary to the device class private signing key embedded on the portable information device. The certifying authority uses the successful device class public signing key to cross-reference in the manufacturer correlation record (e.g., Table 1) to look up the device type, including security properties and operating attributes (step 98). In the event that the request includes the hash digest as opposed to a signed key, the certifying authority uses the digest itself to cross-reference in the manufacturer correlation record to find the device type.

Once the device type is confirmed and the certifying authority is assured that the device was produced by the manufacturer, the certifying authority issues a certificate for the requesting portable information device (step 100). The certificate includes the signed public key, the device serial number, and the public key of the enterprise or policy vender. The certificate might also include a type number or security level, although in some cases the simple presence of a certificate acts implicitly as affirming a certain security level or type. The certificate is signed by the certifying authority using the authority's private signing key $K_{CA\_sign\_pri}$. This provides a certificate as follows:

$$\text{Certificate} = S_{K\ CA\_sign\_pri} \text{(Serial No., Type, Security Level, } SK_{s\_pub}, K_{device\_class\_pub}, K_{vendor\_pub})$$

The certificate is received and stored on the portable information device, as indicated by certificate 66 in FIG. 2 (step 102 in FIG. 4).

Transaction

The portable information device is now prepared for use in a transaction, a process explained with reference to FIG. 5. The portable information device first establishes a communication channel with the computing unit or communicating agent (step 110). This communication channel is preferably secure. The portable information device then sends the certificate, which has been signed by the certifying authority, to the recipient computing unit (step 112). The recipient computing unit evaluates the certificate and, if included, the type and security level (step 114). Since the certificate is signed by the certifying authority and the recipient computing unit can verify this signature, the recipient computing unit trusts the enclosed information and learns the type of device with which it is communicating. Once the type is identified, the computing unit evaluates whether to continue the transaction with such a device (step 116). If the device type is satisfactory for the proposed transaction, the computing unit continues the transaction. If the device type is unsatisfactory, the computing unit ceases further communication or simply returns an indication that the device is lacking the appropriate security level or other attributes.

Because the certifying authority has performed the initial confirmation of device type, and then issues a signed certificate stipulating such, the recipient computing unit does not need to reconfirm the device type. Instead, the computing unit merely accepts the certificate as valid (assuming the certifying authority signature is verified) and determines, based upon the certificate information, whether the device type is satisfactory for the proposed transaction.

Using the above registration and transaction processes, different policies can be established which regulate use of the portable information devices. Suppose the devices are used for monetary transactions. In this case, a policy can be established to relate different security levels to different dollar values. Low security levels limit use of the portable information devices to lower dollar amounts, whereas high security levels permit use of the portable information devices for high dollar amounts. When transacting business with the portable information devices, the communicating agents will evaluate the security level and determine whether to continue the transaction based upon the dollar amount involved and the applicable policy. The policies can be instituted within different markets, or on behalf of certain companies or policy vendors.

As another example, suppose the devices are used for access to company facilities and resources. Policies can be devised to regulate entry or access to these facilities according to different assigned levels. Those devices implemented with low access levels might be restricted to access only certain facilities and resources, whereas devices implemented with high access levels might be allowed unrestricted access.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A method for conducting a transaction between an electronic portable information device and a communicating agent, the portable information device having processing capabilities, memory, and an I/O interface, the portable information device further having a device class tag stored thereon which is indicative of a type of the portable information device, the method comprising the following steps:

forming an output string at the portable information device, the output string including at least a portion that is a result of a mathematical function involving the device class tag in which the device class tag is computationally difficult to deduce from the result;

exporting the output string from the portable information device to the communicating agent; and identifying the type of the portable information device using the exported output string.

2. A method as recited in claim 1 wherein the forming step comprises the step of digitally signing a string using a cryptographic signing function in which the device class tag is a cryptographic signing key.

3. A method as recited in claim 1 wherein the forming step comprises the steps of computing a hash value of the device class tag according to a hashing function and including the hash value or a function thereof as part of the output string.

4. A method as recited in claim 1 further comprising the step of determining security properties associated with the identified type of the portable information device using the exported output string.

5. A method as recited in claim 1 further comprising the step of determining operating attributes associated with the identified type of the portable information device using the exported output string.

6. A method as recited in claim 1 wherein:

the forming step comprises the step of digitally signing a string using the device class tag as a device class private signing key of a device class public/private signing pair;

the method further comprising the step of correlating a corresponding device class public signing key of the device class public/private signing pair with the type of the portable information device so that determination of the device class public signing key to unsign the output string leads to identification of the type of the portable information device.

7. A method as recited in claim 1 wherein the communicating agent is a certifying authority, and further comprising the step of issuing a certificate from the certifying authority that contains, or is indicative of, the type of portable information device.

8. A method for producing a self-identifying portable information device, the portable information device having processing capabilities and memory, the method comprising the following steps:

creating a device class tag, the device class tag having a complementary value which can be mathematically derived from the device class tag in a manner which renders the device class tag computationally difficult to deduce from the complementary value;

electronically storing the device class tag in the memory of the portable information device; and correlating the complementary value with a type of the portable information device so that knowledge of the complementary value leads to identification of the type of the portable information device.

9. A method as recited in claim 8 wherein the device class tag is a private signing key and the complementary value is a corresponding public signing key.

10. A method as recited in claim 8 wherein the complementary value is a hash value resulting from transforming the device class tag according to a hashing function.

11. A method as recited in claim 8 wherein the storing step comprises permanently embedding the device class tag in the portable information device.

12. A method as recited in claim 8 further comprising distributing a list of correlated complementary values and types of portable information devices.

13. A method for identifying a type of portable information device, the portable information device having processing capabilities, memory, and an I/O interface, the portable information device further having a private device class signing key stored thereon which is indicative of a type of the portable information device, the method comprising the following steps:

receiving a signed message from the portable information device, the message having been digitally signed using the private device class signing key on the portable information device;

ascertaining a public signing key that is complementary to the private device class signing key and effective to unsign the message; using the public signing key to identify the type of the portable information device;

determining security properties associated with the identified portable information device; and determining operating attributes associated with the identified portable information device.

14. A method as recited in claim 13 further comprising the additional steps:

correlating a group of possible public signing keys with associated types of portable information devices; and cross-referencing the ascertained public signing key to determine the type of portable information device.

15. A method as recited in claim 13 further comprising the step of determining whether to conduct a transaction with the identified type of portable information device.

16. A computer programmed to perform the steps of the method recited in claim 13.

17. A computer-readable memory which directs a computer to perform the steps of the method recited in claim 13.

18. A method for identifying a type of portable information device, the portable information device having processing capabilities, memory, and an I/O interface, the portable information device further having a private device class tag stored thereon which is indicative of a type of the portable information device, the method comprising the following steps:

receiving a hash value from the portable information device, the hash value being a result of transforming the device class tag according to a hashing function;

determining the type of the portable information device from the received hash value;

determining security properties associated with the identified portable information device; and determining operating attributes associated with the identified portable information device.

19. A method as recited in claim 18 further comprising the additional steps:

correlating hash values with associated types of portable information devices; and cross-referencing the received hash value to determine the type of portable information device.

20. A method as recited in claim 18 further comprising the step of determining whether to conduct a transaction with the identified portable information device.

21. An electronic portable information device programmed to perform the steps of the method recited in claim 18.

22. A computer-readable memory which directs a computer to perform the steps of the method recited in claim 18.

23. A method in which a portable information device identifies itself to a communicating agent, the portable information device having processing capabilities, memory, and an IO interface, the portable information device further having a device class tag stored thereon which is indicative of a type of the portable information device, the method comprising the following steps:

generating an identification packet;

including as part of the identification packet a result of a mathematical function involving the device class tag in which the device class tag is computationally difficult to deduce from the result; and outputting the identification packet to the communicating agent.

24. A method as recited in claim 23 further comprising the following steps:

generating a public/private key pair;

digitally signing the public key using the device class tag as a device class private signing key; and including the signed public key as part of the identification packet.

25. A method as recited in claim 23 further comprising the step of computing a hash value of the device class tag and including the hash value as part of the identification packet.

26. An electronic portable information device programmed to perform the steps of the method recited in claim 23.

27. A computer-readable memory which directs a computer to perform the steps of the method recited in claim 23.

28. A method for registering a portable information device at a certifying authority, the portable information device having processing capabilities, memory, and an I/O interface, the portable information device further having a private device class signing key stored thereon, the certifying authority having access to a record which correlates public device class signing keys with various types of portable information devices, the method comprising the following steps:

generating a pair of public and private keys at the portable information device;

digitally signing the public key, at the portable information device, using the private device class signing key stored thereon;

submitting the signed public key as part of a request to the certifying authority;

receiving the signed public key at the certifying authority;

ascertaining a corresponding public class device signing key that is complementary to the private device class signing key and is effective to unsign the message; and referencing the record using the ascertained public class device signing key to identify the type of the portable information device.

29. A method as recited in claim 28 further comprising the step of sending the public class device signing key as part of the request.

30. A method as recited in claim 28 further comprising the step of issuing a certificate from the certifying authority which contains, or is indicative of, the type of portable information device.

31. A system comprising:

a computing unit;

a portable information device having a processor and a memory, the memory storing a device class tag and data, the device class tag being indicative of a type of the portable information device;

the portable information device being configured to output a message, at least a portion of the message being a result of a mathematical operation involving the device class tag in which the device class tag is computationally difficult to deduce from the result; and the computing unit being configured to use the portion of message to identify the type of the portable information device.

32. A system as recited in claim 31 wherein:

the device class tag is a device class private signing key of a device class public/private signing pair; and the portable information device is configured to digitally sign at least part of the message using the device class private signing key.

33. A system as recited in claim 32 wherein:

the computing unit has access to a group of device class public signing keys which are complementary of various device class private signing keys that are stored on different types of portable information devices, the device class public signing keys being correlated to the types of portable information devices; and the computing unit is configured to try various ones of the device class public signing keys from the group to find a device class public signing key which is complementary to the device class private signing key stored on the portable information device.

34. A system as recited in claim 33 wherein the computing unit is configured to cross-reference the type of portable information device from the public device class signing key that is complementary to the to the device class private signing key stored on the portable information device.

35. A system as recited in claim 31 wherein the portable information device is configured to compute a hash value of the device class tag, and output the hash value as said portion of the message.

36. A system as recited in claim 35 wherein:

the computing unit has access to a group of hash values which are correlated with types of portable information devices; and the computing unit is configured to cross-reference the hash value received in the message to identify the type of portable information device.

37. A system as recited in claim 31 wherein the computing unit is a certifying authority and is configured to issue a certificate which contains, or is indicative of, the type of portable information device.

38. A tamper-resistant portable information device comprising:

a memory to store a device class private signing key indicative of a type of the portable information device; and a processor to generate an identification packet that is output to a communicating agent external to the portable information device, the processor being configured to perform at least one of the following tasks (1) sign at least a portion of the identification packet using the device class private signing key, or (2) compute a hash value of the device class private signing key and include the hash value as part of the identification packet.

* * * * *